United States Patent
Horino

(10) Patent No.: US 9,219,675 B2
(45) Date of Patent: Dec. 22, 2015

(54) COMMUNICATION DEVICE, COMMUNICATION SYSTEM, AND COMPUTER PROGRAM PRODUCT

(75) Inventor: Hironori Horino, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 866 days.

(21) Appl. No.: 13/182,577

(22) Filed: Jul. 14, 2011

(65) Prior Publication Data

US 2012/0030374 A1    Feb. 2, 2012

(30) Foreign Application Priority Data

Jul. 27, 2010   (JP) .................................. 2010-168661

(51) Int. Cl.
    *G06F 15/16*    (2006.01)
    *H04L 12/26*    (2006.01)

(52) U.S. Cl.
    CPC ...................................... *H04L 43/50* (2013.01)

(58) Field of Classification Search
    CPC ............ H04L 61/2585; H04L 61/2578; H04L 61/2575; H04L 61/2565; H04L 61/256; H04L 61/2535; H04L 61/2532; H04L 61/2528; H04L 61/2521; H04L 61/2517; H04L 61/2514; H04L 61/251; H04L 61/2507; H04L 61/2503; H04L 61/25; H04L 61/157; H04L 61/1552; H04L 61/15; H04L 61/1511; H04L 45/745; H04L 45/742; H04L 45/741; H04L 45/74; H04L 45/44; H04L 43/50
    USPC ............... 370/474, 475; 710/3; 709/245, 226, 709/229, 238, 240, 244; 711/200, 202, 203, 711/207, 209, 218, 221
    See application file for complete search history.

(56) References Cited

U.S. PATENT DOCUMENTS

| | | | | |
|---|---|---|---|---|
| 6,396,842 B1 * | 5/2002 | Rochberger | ................... | 370/408 |
| 6,591,306 B1 * | 7/2003 | Redlich | .................... | 709/245 |
| 7,613,703 B2 * | 11/2009 | Kakivaya et al. | ................... | 1/1 |
| 8,208,155 B2 * | 6/2012 | Shouno | .................... | 358/1.15 |
| 8,427,691 B2 * | 4/2013 | Jang | ............................. | 358/1.16 |

(Continued)

FOREIGN PATENT DOCUMENTS

| JP | 2003-46569 | 2/2003 |
|---|---|---|
| JP | 2006-313526 | 11/2006 |

(Continued)

*Primary Examiner* — Phuoc Nguyen
*Assistant Examiner* — Davoud Zand
(74) *Attorney, Agent, or Firm* — Oblon, McClelland, Maier & Neustadt, L.L.P.

(57) ABSTRACT

A communication device connected to a plurality of communication target devices, includes an address storage unit storing addresses of the communication target devices; a destination changing unit changing a destination address included in an outgoing message to any one of the addresses stored in the address storage unit, the outgoing message being generated using target software to be evaluated; a transmitting unit transmitting the outgoing message for which the destination address has been changed to the communication target device with the changed destination address; a receiving unit receiving, from the communication target device, a reply message in response to the outgoing message; a source changing unit changing a source address included in the reply message to the destination address that is obtained before being changed by the destination changing unit; and an output unit outputting, to the software, the reply message for which the source address has been changed.

10 Claims, 12 Drawing Sheets

(56) References Cited

U.S. PATENT DOCUMENTS

| | | |
|---|---|---|
| 8,514,718 B2* | 8/2013 | Zijst ............................... 370/238 |
| 2002/0083199 A1* | 6/2002 | Dingsor et al. ............... 709/245 |
| 2003/0074420 A1* | 4/2003 | Hoshino et al. ............... 709/218 |
| 2003/0091167 A1* | 5/2003 | Hirai ........................... 379/93.01 |
| 2004/0243710 A1* | 12/2004 | Mao .............................. 709/227 |
| 2006/0242148 A1* | 10/2006 | Rothpearl et al. ................. 707/7 |
| 2009/0013071 A1* | 1/2009 | Matoba et al. ................. 709/224 |
| 2009/0067414 A1* | 3/2009 | Toscano et al. ................ 370/353 |
| 2010/0088333 A1* | 4/2010 | Takahashi ..................... 707/765 |

FOREIGN PATENT DOCUMENTS

| | | |
|---|---|---|
| JP | 2008-98844 | 4/2008 |
| JP | 2008-109404 | 5/2008 |

\* cited by examiner

FIG.3

| 221 |
|---|
| VIRTUAL COMMUNICATION TARGET IP ADDRESS |
| A1 |
| A2 |
| A3 |
| ⋮ |

FIG.4

| 121 |
|---|
| COMMUNICATION TARGET IP ADDRESS |
| B1 |
| B2 |
| B3 |
| ⋮ |

FIG.5

| COMMUNICATION TARGET IP ADDRESS | PRE-CHANGE IP ADDRESS |
|---|---|
| B1 | A1 |
| B2 | A2 |
| B3 |  |
| ⋮ | ⋮ |

START
↓
RECEIVE COMMUNICATION REQUEST PACKET — S101
↓
CHANGE DESTINATION ADDRESS INCLUDED IN PACKET TO ANY ONE OF ADDRESSES OF ADDRESS STORAGE UNIT — S102
↓
TRANSMIT COMMUNICATION REQUEST PACKET TO COMMUNICATION TARGET DEVICE WITH CHANGED ADDRESS — S103
↓
RECEIVE REPLY PACKET FROM COMMUNICATION TARGET DEVICE — S104
↓
CHANGE SOURCE ADDRESS INCLUDED IN REPLY PACKET TO PRE-CHANGE ADDRESS — S105
↓
TRANSMIT REPLY PACKET TO EVALUATION TARGET DEVICE — S106
↓
END

FIG.8

| VIRTUAL COMMUNICATION TARGET IP ADDRESS | COMMUNICATION TARGET IP ADDRESS |
|---|---|
| A1 | B1 |
| A2 | B2 |
| A3 | B3 |
| ⋮ | ⋮ |

| VIRTUAL COMMUNICATION TARGET IP ADDRESS | COMMUNICATION TARGET IP ADDRESS |
|---|---|
| A1 | B1 |
| A2<br>A3 | B2 |
| A4 | B3<br>B4 |
| ⋮ | ⋮ |

| COMMUNICATION TARGET IP ADDRESS | PRE-CHANGE IP ADDRESS |
|---|---|
| B1 | A1 |
| B2 | A2 |
| B3 | A3 |
| ⋮ | ⋮ |

| COMMUNICATION TARGET IP ADDRESS | PRE-CHANGE IP ADDRESS |
|---|---|
| B1 | |
| B2 | A2 |
| B3 | A3 |
| ⋮ | ⋮ |

| CHARACTER STRING | COMMUNICATION TARGET IP ADDRESS |
|---|---|
| Copy Counter | B1<br>B3<br>B4 |
| Scan Counter | B2<br>B3<br>B4 |
| Fax Counter | B4 |
| Color Copy Counter | B1<br>B4 |

| VIRTUAL COMMUNICATION TARGET IP ADDRESS | CHARACTER STRING | COMMUNICATION TARGET IP ADDRESS |
|---|---|---|
| A1 | Copy Counter | B1 |
| A1<br>A2 | Scan Counter | B2 |
| A1 | Copy Counter<br>Scan Counter | B3<br>B4 |
| A1 |  | B1 |

121c

| CHARACTER STRING | POST COMMUNICATION-COMPLETION START-PROGRAM PATH |
|---|---|
| Entry Address | X://abc/delete-address.exe |
| Counter | X://abc/reset-counter.exe |

COMMUNICATION DEVICE, COMMUNICATION SYSTEM, AND COMPUTER PROGRAM PRODUCT

CROSS-REFERENCE TO RELATED APPLICATIONS

The present application claims priority to and incorporates by reference the entire contents of Japanese Patent Application No. 2010-168661 filed in Japan on Jul. 27, 2010.

BACKGROUND OF THE INVENTION

1. Field of the Invention

The present invention relates to a communication device, a communication system, a computer program product.

2. Description of the Related Art

A conventional system is known where various settings and requests are made to a plurality of network-connected image forming apparatuses from a personal computer (PC) or a different image forming apparatus. As one of such technologies, a system is known that distributes an address book from a digital multifunctional peripheral (MFP) to a different digital multifunctional peripheral.

An example of a system that has a plurality of network-connected image forming apparatuses is a system that has become popular in recent years and that uses, for example, an apparatus (hereinafter, referred to as a "multifunctional peripheral") that has a printer, scanner, facsimile, and copy functions, and the like, in combination and that is connected to a network such as a LAN.

In such a system, for example, a single PC, a single printer, or a single multifunctional peripheral is used for controlling a number of image forming apparatuses that are connected to a LAN so as to perform a central control on the settings of these image forming apparatuses. A user makes a specific setting by using the control apparatus so that the setting is automatically distributed to a number of image forming apparatuses connected to the LAN.

Because of the provision of such a function, a setting for a sheet discharge in the copy function, e.g., a setting for "always copying to both sides of a sheet when reading two one-side printed originals with blank reverse sides" can be a standard setting, for example, in an office that uses the system. Specifically, the function can be used such that simply making a setting on one PC or multifunctional peripheral causes the automatic distribution of the setting to the other multifunctional peripherals. Thus, it is possible to avoid the trouble of having to manually make settings, one by one, to all the multifunctional peripherals that have a copy function and are located in the office.

Furthermore, for instance, for management of charging for print copies by using a department ID, the setting of the department ID in one printer or multifunctional peripheral can cause the automatic distribution of the setting to the other apparatuses. Thus, it is possible to reduce the inconvenience of charge management, i.e., having to individually set the department ID in a number of printers or multifunctional peripherals.

For development of communication software to be used in the useful system as described above, an evaluation test is often conducted so as to check and guarantee functions of the software. The evaluation test has become increasingly important because of the increasing likelihood of communication errors in accordance with the increasing number of printers or multifunctional peripherals connected to the system.

The evaluation for communication software is performed by conducting a series of tests, such as an operation check or debugging, with respect to, for example, a "distributing function" for settings, and the like, using distribution-side software or a "receiving function" for settings, and the like, using reception-side software.

A conventional evaluation method is a method using an actual printer or multifunctional peripheral body or a special hardware device as a simulator corresponding to the above devices.

For testing a system that uses a plurality of devices, the cost of preparing the devices becomes higher as the scale of the system becomes larger.

As disclosed in Japanese Patent Application Laid-open No. 2003-046569, there is a method for emulating a plurality of clients by using one PC. Although it is indicated in Japanese Patent Application Laid-open No. 2003-046569 that one PC is used to operate a plurality of virtual clients, an individual virtual client does not have an independent communication function. In such a configuration, for an evaluation of parallel communication processing for a plurality of devices, a communication function such as a network board is a bottleneck. Therefore, there is a possibility that performance cannot be properly measured, and the method cannot be used for performance evaluation. Furthermore, in order to perform a detailed evaluation of performance, it is possible to acquire an actual value by using an actual device other than a virtual client.

SUMMARY OF THE INVENTION

It is an object of the present invention to at least partially solve the problems in the conventional technology.

According to an aspect of the present invention, there is provided a communication device that is connected to a plurality of communication target devices, the communication device including: an address storage unit that stores addresses of the communication target devices; a destination changing unit that changes a destination address included in an outgoing message to any one of the addresses stored in the address storage unit, the outgoing message being generated using target software to be evaluated; a transmitting unit that transmits the outgoing message for which the destination address has been changed to the communication target device with the changed destination address; a receiving unit that receives, from the communication target device, a reply message in response to the outgoing message; a source changing unit that changes a source address included in the reply message to the destination address that is obtained before being changed by the destination changing unit; and an output unit that outputs, to the software, the reply message for which the source address has been changed.

According to another aspect of the present invention, there is provided a communication system including: an evaluation target device that executes target software to be evaluated; a communication target device that is a communication target of the software; and a communication device that is connected to the evaluation target device and the communication target device, wherein the evaluation target device executes the software so as to transmit an outgoing message to the communication device and receives, from the communication device, a reply message in response to the outgoing message, the communication device includes an address storage unit that stores an address of the communication target device; a destination changing unit that changes a destination address included in the outgoing message transmitted using the software to any one of addresses stored in the address storage unit; a transmitting unit that transmits the outgoing message for which the destination address has been changed to the communication target device with the changed destination address; a receiving unit that receives, from the communication target device, a reply message in response to the outgoing message; a source changing unit that changes a source address included in the reply message to the destination address that is obtained before being changed by the destination changing unit; and an output unit that outputs, to the software, the reply message for which the source address has been changed, and the communication target device includes a transmitting/receiving unit that receives, from the communication device, the outgoing message for which the destination address has been changed and that transmits, to the communication device, a reply message in response to the received outgoing message.

According to another aspect of the present invention, there is provided a computer program product including a non-transitory computer-readable medium having computer-readable program codes, performed by a communication device, the program codes when executed causing the communication device to execute: storing, by an address storage unit, addresses of communication target devices; changing, by a destination changing unit, a destination address included in an outgoing message to any one of the addresses stored in the address storage unit, the outgoing message being generated using target software to be evaluated; transmitting, by a transmitting unit, the outgoing message for which the destination address has been changed to the communication target device with the changed destination address; receiving, by a receiving unit, from the communication target device, a reply message in response to the outgoing message; changing, by a changing unit, a source address included in the reply message to the destination address that is obtained before being changed at the changing; and outputting, by an output unit, to the software, the reply message for which the source address has been changed.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a table that illustrates an example of the data structure of data stored in an address storage unit of an evaluation target device according to the first embodiment;

FIG. 4 is a table that illustrates an example of the data structure of data stored in an address storage unit of a communication device according to the first embodiment;

FIG. 5 is a table that illustrates an example of the data structure of a relation list stored in a list storage unit;

FIG. 6 is a flowchart that illustrates the overall communication processing according to the first embodiment;

FIG. 8 is a table that illustrates an example of the data structure of data (an address change rule) stored in an address storage unit according to the second embodiment;

FIG. 9 is a table that illustrates another example of the data structure of data (the address change rule) stored in the address storage unit according to the second embodiment;

FIG. 11 is a table that illustrates an example of a relation list from which an IP address has not been deleted;

FIG. 12 is a table that illustrates an example of the relation list from which an IP address has been deleted;

FIG. 14 is a table that illustrates an example of the data structure of data (the address change rule) stored in an address storage unit according to the fourth embodiment;

FIG. 15 is a table that illustrates another example of the data structure of data (the address change rule) stored in the address storage unit according to the fourth embodiment;

DETAILED DESCRIPTION OF THE PREFERRED EMBODIMENTS

A detailed explanation is given below, with reference to the accompanying drawings, of an embodiment of a communication device, a communication system, a communication method, and a computer program product.

First Embodiment

According to a first embodiment, the address of a target device to be communicated with (hereinafter, referred to as a communication target device) is pre-registered in a communication device such as a proxy server that relays a transmitted/received packet. A device that executes target software to be evaluated (hereinafter, referred to as an evaluation target device) tries to communicate with a network device in accordance with the settings of the evaluation target device. When the evaluation target device tries to access a device, the communication device changes the destination address for the communication to the address (hereinafter, referred to as a registered address) of a registered communication target device. Thus, it is possible to create a situation where, although the evaluation target device acts like it accesses devices with different addresses, a small number of devices are assigned in rotation as the actual communication devices. In other words, it is possible to reduce the number of actual devices that are necessary for the evaluation.

Figure 1:
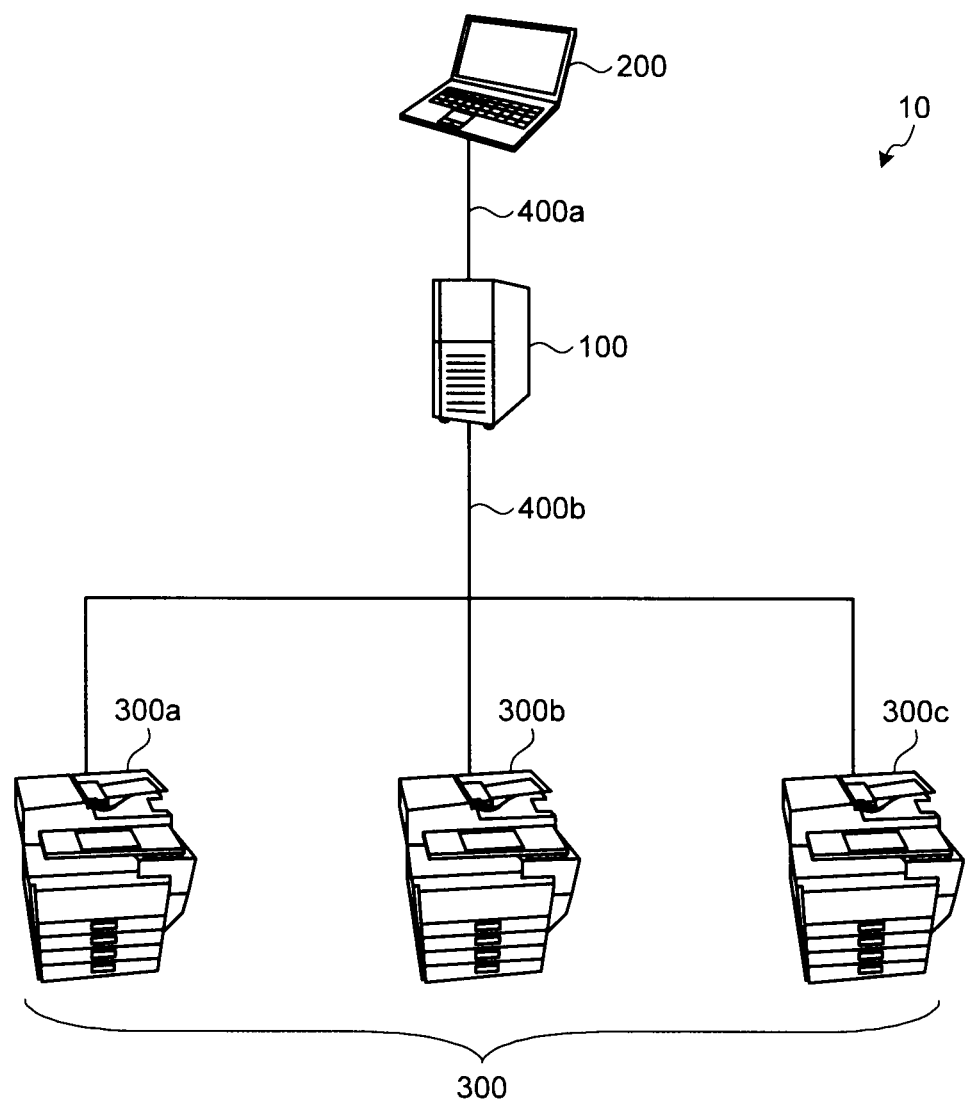
FIG. 1 is a schematic view that illustrates a configuration example of a communication system according to a first embodiment.

FIG. 1 is a schematic view that illustrates a configuration example of a communication system 10 according to the first embodiment. The communication system 10 has a configuration such that an evaluation target device 200, a communication device 100, and communication target devices 300a, 300b, and 300c, . . . are connected to one another via networks 400a and 400b. As illustrated in FIG. 1, the communication device 100 may be implemented as an independent device such as a proxy server or router. A function of the communication device 100 may be implemented as a network driver included in the evaluation target device 200.

In the following descriptions, the "communication target device 300a, 300b, and 300c, . . . " may simply refer to communication target device(s) 300 because the communication target devices 300a, 300b, and 300c, . . . all have the same configuration.

The number of the communication target device(s) 300 is not limited to three. All network forms, such as a LAN or the Internet, can be applied to the networks 400a and 400b. An explanation is given below of, for example, a network where communication is established using an IP address according to a protocol such as TCP/IP.

An explanation is given below of the outline of the configuration of the communication system 10 according to the present embodiment. First, the addresses of the communication target device(s) 300 need to be registered in the communication device 100 as registered addresses.

There may be only one communication target device 300(s) to be registered; however, in order to evaluate the case where the evaluation target device 200 accesses a plurality of devices at the same time, it is preferable that more than one of the communication target device(s) 300 is prepared and registered in consideration of the status of each device and its processing speed.

Because there is a need to prevent access to the same device at the same time or because communication between the evaluation target device 200 and the communication target device(s) 300 may require several steps, it is preferable that the communication device 100 manages information on which registered address is assigned to which address.

An example of the assignment method includes a rotation method, whereby, if the evaluation target device 200 performs communication with 100 devices by 5 threads, 10 communication target devices 300a to 300j are prepared, access to the first 5 devices is assigned to the communication target devices 300a to 300e, access to the sixth to tenth devices is assigned to the communication target devices 300f to 300j upon completion of the communication with the communication target devices 300a to 300e, and then access to the eleventh device is again assigned to the communication target device 300a. The assignment method is not limited to the above method and any method can be used. For example, a method of assigning a registered address that is randomly selected from registered addresses that have not been assigned yet can be used.

Packet information to be changed is not limited to a destination address. It is preferable to perform an operation such that, when a packet is to be transmitted to the communication target device(s) 300, the source address is changed to the address of the communication device 100 and the source address of a packet to be transmitted to the evaluation target device 200 is changed to the original address (first designated as a destination by the evaluation target device 200).

Figure 2:
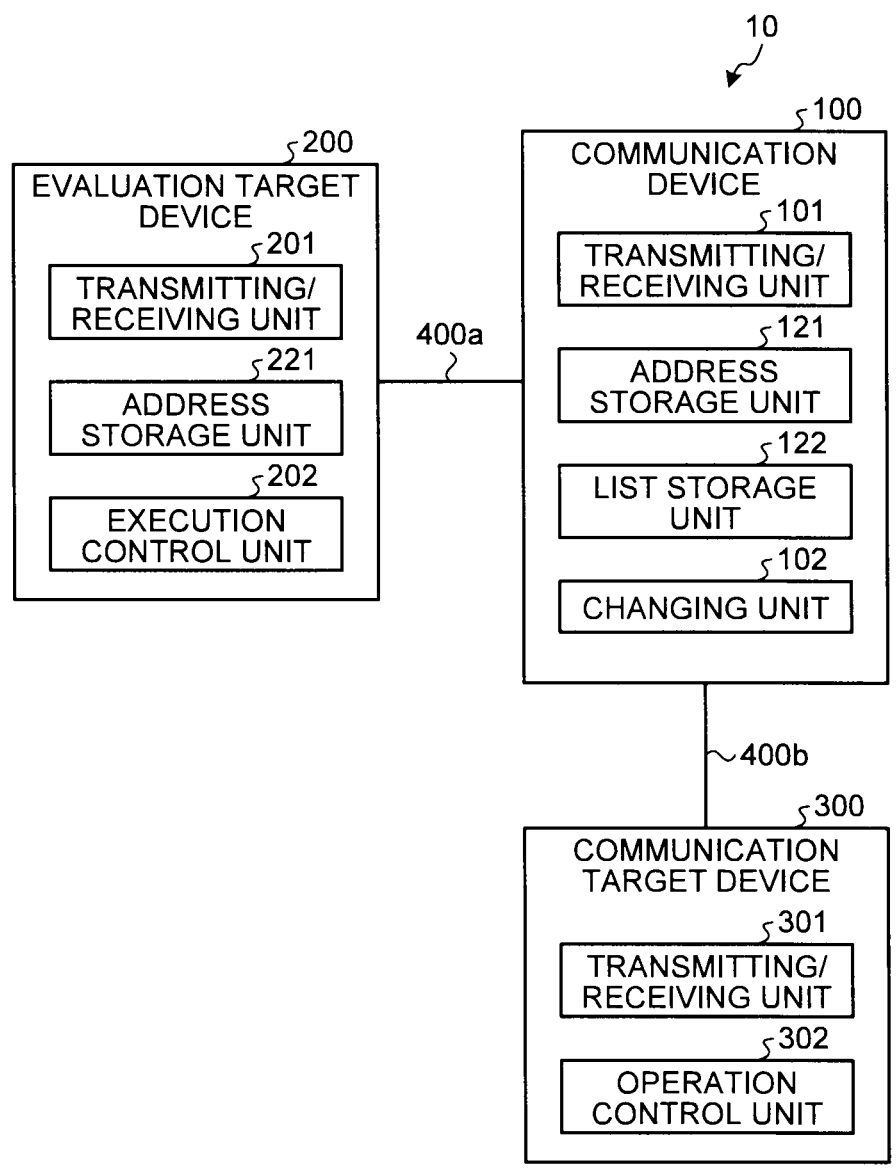
FIG. 2 is a block diagram that illustrates an example of the detailed configuration of each device included in the communication system according to the first embodiment.

FIG. 2 is a block diagram that illustrates an example of the detailed configuration of each device included in the communication system 10 according to the first embodiment. As illustrated in FIG. 2, the evaluation target device 200 includes an address storage unit 221, an execution control unit 202, and a transmitting/receiving unit 201.

The address storage unit 221 stores the IP address of a virtual communication target (a virtual communication target IP address) to be used for evaluation by evaluation target software. For example, if a test is conducted for communication with 1000 devices, the IP addresses of the 1000 devices are stored in the address storage unit 221. FIG. 3 is a table that illustrates an example of the data structure of data stored in the address storage unit 221 according to the first embodiment. FIG. 3 illustrates an example where three IP addresses, A1, A2, and A3 are stored as IP addresses that are communication targets of the software.

Refer back to FIG. 2. The execution control unit 202 controls execution of target software to be evaluated. For example, the execution control unit 202 is implemented by a central processing unit (CPU) that reads software from a storage unit, such as an undepicted hard disk drive (HDD), and executes the read software.

The transmitting/receiving unit 201 transmits/receives a message (hereinafter, also referred to as a packet) via the network 400a in accordance with a request, or the like, according to the software executed by the execution control unit 202.

The communication device 100 includes an address storage unit 121, a list storage unit 122, a transmitting/receiving unit 101, and a changing unit 102.

The address storage unit 121 stores the IP addresses (the communication target IP addresses) of the communication target device(s) 300 that is the actual devices to be actually used for a test. For example, if ten communication target device(s) 300 is used, the address storage unit 121 stores the IP addresses of the ten communication target devices 300a to 300j. FIG. 4 is a table that illustrates an example of the data structure of data stored in the address storage unit 121 according to the first embodiment. FIG. 4 illustrates an example where three IP addresses, B1, B2, and B3 are stored as the communication target IP addresses.

Refer back to FIG. 2. The list storage unit 122 stores a relation list that relates the IP address (the communication target IP address) that is obtained after being changed by the changing unit 102 to the IP address that was obtained before being changed. FIG. 5 is a table that illustrates an example of the data structure of the relation list stored in the list storage unit 122. In the example illustrated in FIG. 5, no virtual communication target IP address has yet been related to the communication target IP address "B3". This indicates that no communication request has been transmitted to the communication target device(s) 300 with the communication target IP address "B3". A configuration may be such that, as illustrated in FIG. 5, the relation lists are pre-stored corresponding to the number of the communication target device(s) 300 or a relation list is generated and stored for only any of the communication target device(s) 300 for which a relation is established.

Refer back to FIG. 2. The transmitting/receiving unit 101 transmits/receives a packet between external devices such as the evaluation target device 200 and the communication target device(s) 300. For example, the transmitting/receiving unit 101 receives a packet that is transmitted from the evaluation target device 200. Furthermore, the transmitting/receiving unit 101 transmits, to the communication target device(s) 300, a packet whose destination IP address has been changed by the changing unit 102. The transmitting/receiving unit 101 receives, from the communication target device(s) 300, a reply packet in response to the transmitted packet. Further, the transmitting/receiving unit 101 functions as an output unit that outputs (transmits), to the evaluation target device 200, a reply packet whose source IP address has been changed by the changing unit 102.

The changing unit 102 changes the destination IP address or the source IP address of a received packet. For example, the changing unit 102 functions as a destination changing unit that changes the destination IP address included in a packed received from the evaluation target device 200 to any one of the communication target IP addresses stored in the address storage unit 121. Furthermore, the changing unit 102 functions as a source changing unit that acquires, from the list storage unit 122, the pre-change IP address that is linked to the communication target IP address that matches the source IP address contained in the reply packet received from the communication target device(S) 300 and changes the source IP address contained in the reply packet to the acquired pre-change IP address.

The communication target device 300(S) includes a transmitting/receiving unit 301 and an operation control unit 302. The transmitting/receiving unit 301 transmits/receives a packet to/from the communication device 100. The operation control unit 302 controls execution of an operation corresponding to a received packet.

Next, an explanation is given, with reference to FIG. 6, of the communication processing performed by the above-described communication device 100 according to the first embodiment. FIG. 6 is a flowchart that illustrates the overall communication processing according to the first embodiment.

The communication processing illustrated in FIG. 6 is based on the assumption that, first, the execution control unit 202 of the evaluation target device 200 executes a test program (target software to be evaluated). The test program transmits, to the communication device 100 via the transmitting/receiving unit 201, a communication request packet that requests a communication with a communication destination (a virtual communication target IP address) stored in the address storage unit 221. A communication request packet may include a test command, or the like, to perform an operation.

The transmitting/receiving unit 101 of the communication device 100 receives a communication request packet (Step S101). The changing unit 102 changes the destination IP address included in the received communication request packet to any one of the communication destinations (the communication target IP addresses) stored in the address storage unit 121 (Step S102), generates a relation list that relates the destination IP address that is obtained before a change, the pre-change IP address, to the IP address (the communication target IP address) that is obtained after a change, and stores the relation list in the list storage unit 122. For example, by using the rotation method described above, the changing unit 102 selects a communication target IP address to which the IP address is to be changed.

The transmitting/receiving unit 101 transmits the communication request packet whose destination IP address has been changed to the communication target device(s) 300 with the changed communication destination (communication target IP address) (Step S103). The communication target device(S) 300 returns, to the communication device 100, a reply packet that is a result corresponding to the contents of the communication request packet.

The transmitting/receiving unit 101 receives the reply packet from the communication target device(S) 300 (Step S104). The changing unit 102 acquires, from the relation list stored in the list storage unit 122, the pre-change IP address that is related to the source IP address (the IP address of the communication target device(s) 300 that has transmitted the reply packet) of the reply packet and changes the source IP address to the acquired pre-change IP address (Step S105). The transmitting/receiving unit 101 transmits, to the evaluation target device 200, the reply packet whose source IP address has been changed (Step S106).

If the number of the registered communication target devices(S) 300 is fewer than the number of devices that can be communicated with the evaluation target device 200 at the same time, a problem can occur in that access to a single device is made more than once and there is overlapping of access. Accurate evaluation cannot be conducted in such a case; therefore, if a user does not know of the occurrence of the problem, there is a possibility that an erroneous evaluation result is output or time is wasted. Therefore, a configuration may be such that, if a problem occurs in that, for example, a communication target IP address assigned by the changing unit 102 does not exist, the transmitting/receiving unit 101 notifies a user with an error message indicating that a problem has occurred. In this manner, it is possible to reduce the occurrence of a problem such as an output of an erroneous evaluation result.

Thus, according to the first embodiment, it is possible to evaluate software, which is a target to be evaluated, by using a number of the communication target device(s) 300 that is fewer than the number of communication target devices that the software expects.

Second Embodiment

In the first embodiment, an address to which the IP address is to be changed is selected from the communication target IP addresses by the rotation method or randomly. However, each of the communication target device(s) 300 may have a different function, performance, or setting. Therefore, intended evaluation may not be performed if, for example, a destination address for communication by the evaluation target device 200 is simply changed to the address of the randomly selected communication target device(s) 300.

In the second embodiment, it is possible to set an address change rule that defines a rule for changing a destination address included in a packet to the address of any one of the actual devices (the communication target device(s) 300). A method of describing the address change rule can include a method of assigning addresses in relation to one another on a one-to-one, multiple-to-one, one-to-multiple, and multiple-to-multiple basis.

A method of assigning multiple addresses to one address is, for example, a method of changing all addresses that satisfy a specified condition to the address of one designated device. A method of assigning one address to multiple addresses is, for example, a method of changing one designated address to any one of the addresses of the devices that satisfy a condition (for instance, changing to the address of a device that is not in communication at that time). A method of assigning multiple addresses to multiple addresses is, for example, a method of changing an address included in an address group 1 to any one of the addresses of the multifunctional peripherals out of the communication target device(s) 300 and changing an address included in an address group 2 to any one of the addresses of the printers out of the communication target device(s) 300.

Figure 7:
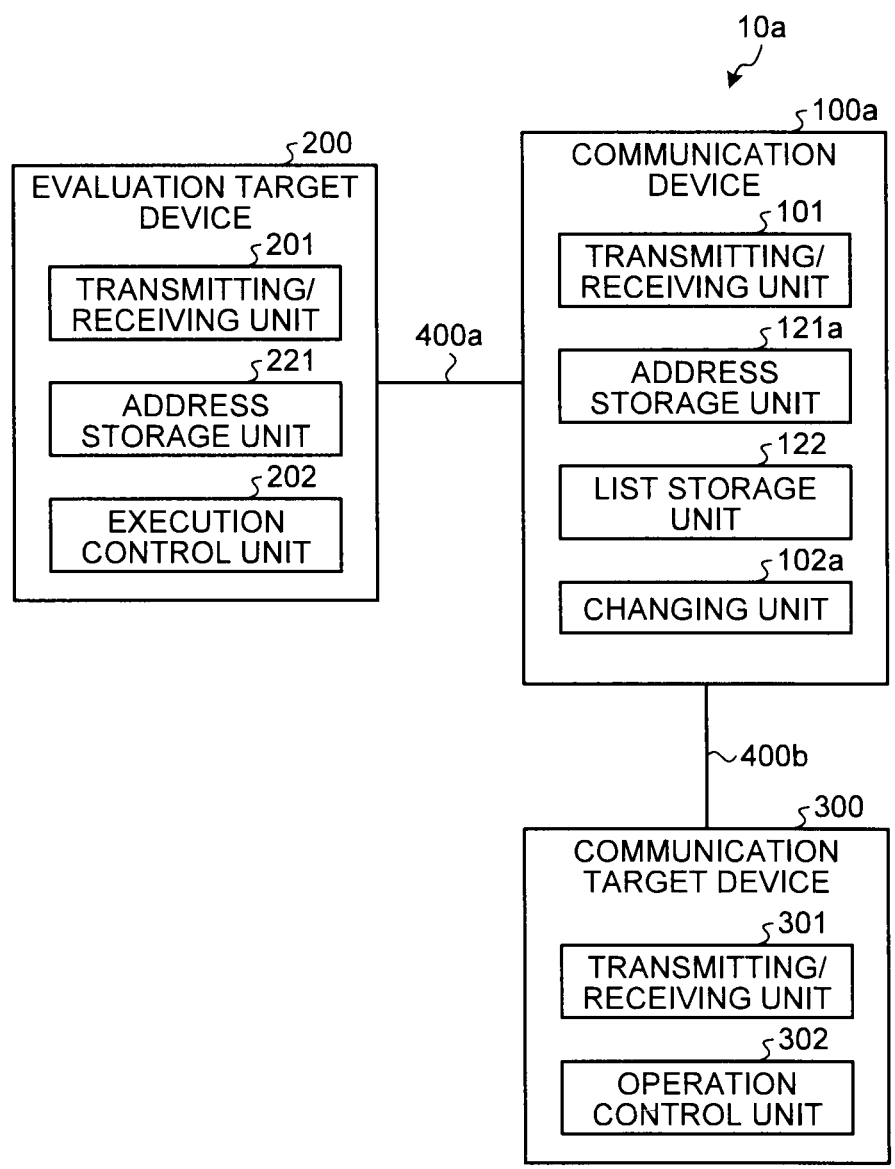
FIG. 7 is a block diagram that illustrates an example of the detailed configuration of each device included in a communication system according to a second embodiment.

FIG. 7 is a block diagram that illustrates an example of the detailed configuration of each device included in a communication system 10a according to the second embodiment. In the second embodiment, the configuration of a communication device 100a is different from that in the first embodiment. Because the functions of the other devices are the same as those illustrated in FIG. 2, these devices are denoted with the same reference numerals and their explanations are omitted.

As illustrated in FIG. 7, the communication device 100a includes an address storage unit 121a, the list storage unit 122, the transmitting/receiving unit 101, and a changing unit 102a. In the second embodiment, the data structure of the address storage unit 121a and the function of the changing unit 102a are different from those in the first embodiment.

Because the configurations and functions of the other units are the same as those illustrated in FIG. 2, a block diagram illustrating the configuration of the communication device 100 according to the first embodiment, these units are denoted with the same reference numerals and their explanations are omitted here.

The address storage unit 121a is different from the address storage unit 121 according to the first embodiment in that the address storage unit 121a stores the IP addresses (the communication target IP addresses) of the communication target device(s) 300 as an address change rule. A configuration may be such that the address change rule is stored in a storage unit different from the address storage unit 121a.

FIG. 8 is a table that illustrates an example of the data structure of data (the address change rule) stored in the address storage unit 121a according to the second embodiment. As illustrated in FIG. 8, the address storage unit 121a stores the address change rule where a virtual communication target IP address is linked to a communication target IP address. FIG. 8 illustrates an example of the address change rule where a destination IP address (a virtual communication target IP address) included in a packet is related, on a one-to-one basis, to an IP address (a communication target IP address) to which the destination IP address is to be changed.

FIG. 9 is a table that illustrates another example of the data structure of data (the address change rule) stored in the address storage unit 121a according to the second embodiment. FIG. 9 illustrates an example of the address change rule where a virtual communication target IP address is related to a communication target IP address on a multiple-to-one and one-to-multiple basis.

Refer back to FIG. 7. The changing unit 102a is different from the changing unit 102 according to the first embodiment in that the changing unit 102a refers to the address change rule illustrated in FIG. 8 or 9 so as to determine an IP address (a communication target IP address) to which the destination IP address is to be changed.

Specifically, according to the second embodiment, for example, at Step S102 illustrated in FIG. 6, the changing unit 102a changes the destination IP address to any one of the communication target IP addresses in accordance with the address change rule.

If an address change rule is described on a one-to-multiple or multiple-to-multiple basis, the changing unit 102a selects a communication target IP address to which the destination IP address is to be changed other than a communication target IP address for which a relation has been already made in the relation list of the list storage unit 122. A selection may be, for example, in a random manner.

As described above, according to the second embodiment, a destination address designated by a packet can be changed to any one of the addresses of actual devices (the communication target device(s) 300 in accordance with a specific rule. Therefore, it is possible to conduct appropriate evaluation intended by the evaluation target device 200.

Third Embodiment

During a communication between the evaluation target device 200 and the communication target device(s) 300, it is likely that results (replies) are returned multiple times in response to a one-time communication request. In a third embodiment, it is determined whether all results have been returned in response to a communication request.

Figure 10:
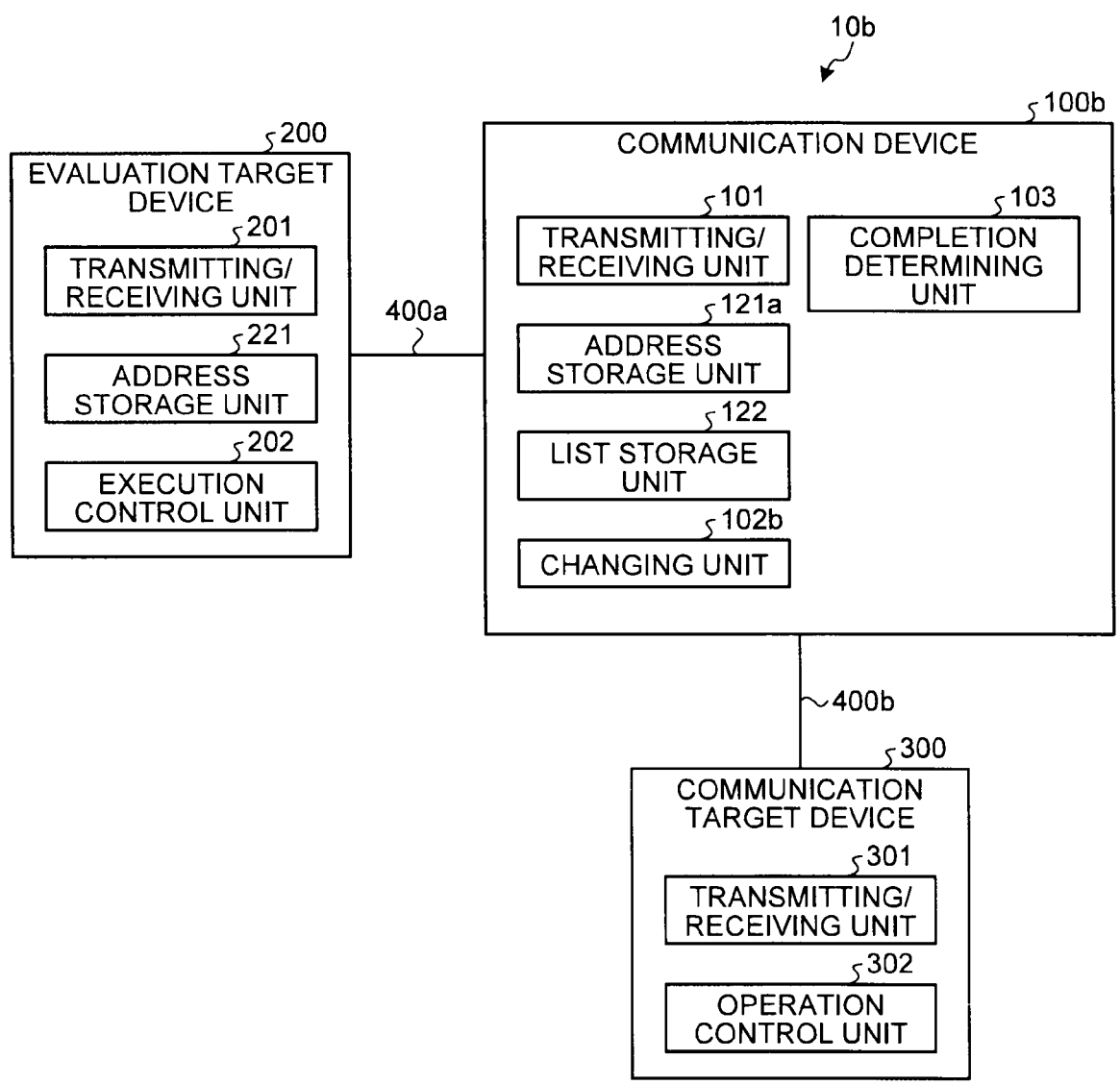
FIG. 10 is a block diagram that illustrates an example of the detailed configuration of each device included in a communication system according to a third embodiment.

FIG. 10 is a block diagram that illustrates an example of the detailed configuration of each device included in a communication system 10b according to the third embodiment. In the third embodiment, the configuration of a communication device 100b is different from that in the second embodiment. Because the functions of the other devices are the same as those illustrated in FIGS. 2 and 7, these devices are denoted with the same reference numerals and their explanations are omitted.

As illustrated in FIG. 10, the communication device 100b includes the address storage unit 121a, the list storage unit 122, the transmitting/receiving unit 101, a changing unit 102b, and a completion determining unit 103. The third embodiment is different from the second embodiment with the addition of the completion determining unit 103 and in the function of the changing unit 102b. Because the configurations and functions of the other units are the same as those illustrated in FIG. 7, a block diagram that illustrates the configuration of the communication device 100a according to the second embodiment, these units are denoted with the same reference numerals and their explanations are omitted here.

The completion determining unit 103 determines whether a communication has been completed with respect to a communication request packet. The completion determining unit 103 determines whether the communication has been completed by using, for example, information contained in a reply packet. For instance, information to be used for determination includes "terminate session", and the like. The completion determining unit 103 determines that the communication has been completed if a reply packet includes predefined information indicating the completion of the communication as described above. A configuration may be such that, if information to be used for determination is different depending on each of the communication target device(s) 300, information (a determination list) is stored in which each of the communication target device(s) 300 is linked to information used for determination.

The changing unit 102b is different from the changing unit 102a according to the second embodiment in that, if the completion determining unit 103 determines that the communication has been completed, the changing unit 102b has an additional function of deleting, from the relation list, information on the communication target device(s) 300 for which the communication has been completed.

In the third embodiment, the process described below is additionally performed. Specifically, when a reply packet is received (for example, at Step S104 illustrated in FIG. 6), the completion determining unit 103 analyzes the reply packet to determine whether all replies have been returned in response to the communication request packet and the communication has been completed.

If it is determined that the result reply from the communication target device(s) 300 has been completed and after all result information in response to the communication request packet has been transmitted to the evaluation target device 200, the changing unit 102b deletes, from the relation list, the pre-change IP address that is registered in relation to the corresponding communication target device(s) 300. The relation list as well as the pre-change IP address may be deleted.

FIG. 11 is a table that illustrates an example of a relation list from which an IP address has not been deleted. FIG. 12 is a table that illustrates an example of the relation list from which an IP address has been deleted. FIG. 12 illustrates an example where the pre-change IP address "A1" has been deleted from the relation list because of the completion of the communication with the communication target device(s) 300 that has the communication target IP address "B1" that is illustrated on the first line of the table in FIG. 11. As described above, the whole first line may be deleted from the relation list.

As described above, an IP address is deleted from a relation list if a communication has been completed so that it is possible to properly determine whether the communication target device(s) 300 is currently in communication. Specifically, if a communication request packet is afterward received from the evaluation target device 200, the changing unit 102*b* refers to the address storage unit 121*a* and the relation list so as to select an IP address to which the destination IP address is to be changed from the IP addresses of the communication target device(s) 300 that is not currently in communication (that are not included in the relation list).

Fourth Embodiment

The second embodiment uses the address change rule that links a destination address to a post-change address. According to a fourth embodiment, an explanation is given of an example where an address change rule is used which relates the content of a packet to a post-change address.

Figure 13:
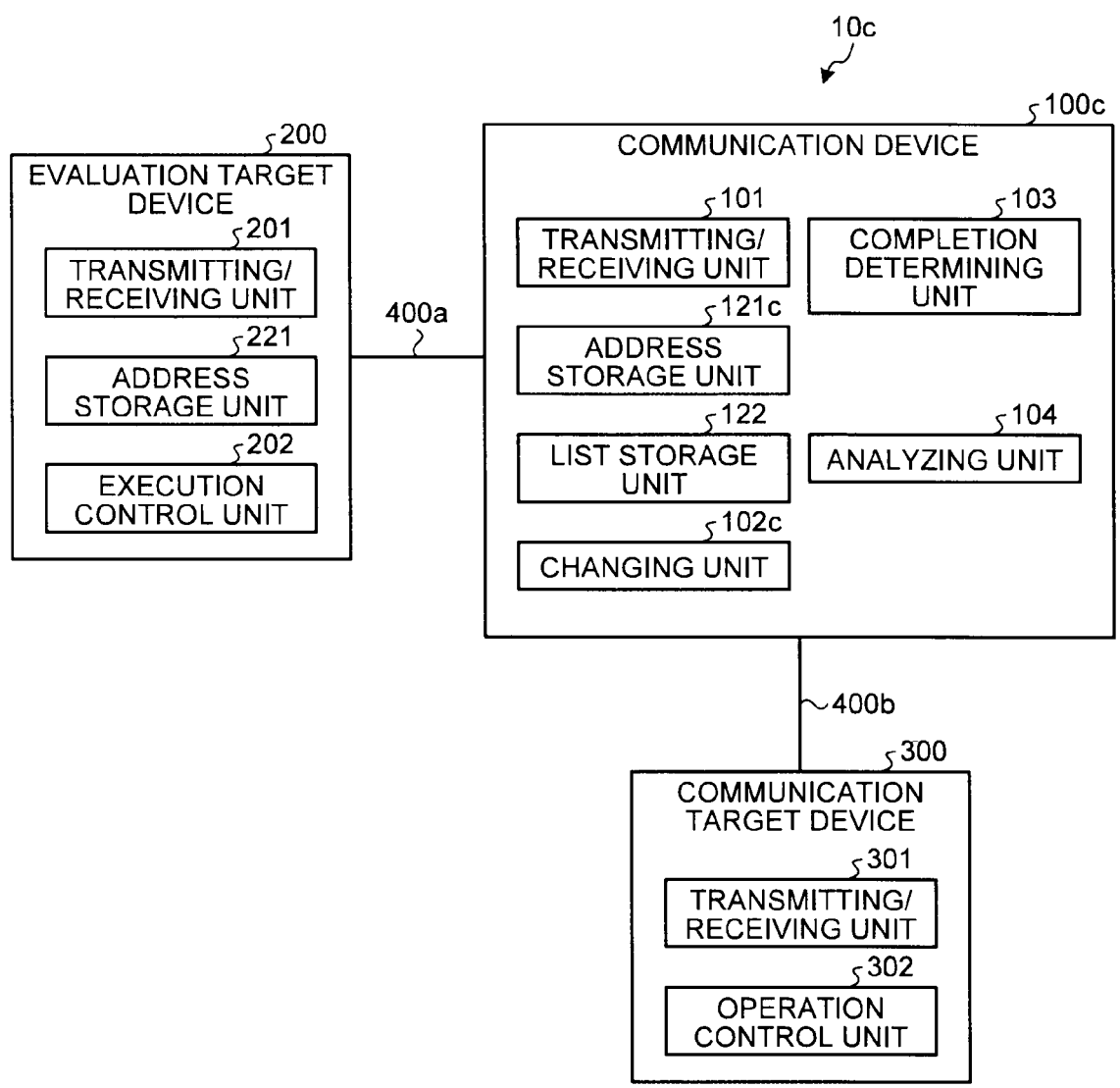
FIG. 13 is a block diagram that illustrates an example of the detailed configuration of each device included in a communication system according to a fourth embodiment.

FIG. 13 is a block diagram that illustrates an example of the detailed configuration of each device included in a communication system 10*c* according to the fourth embodiment. In the fourth embodiment, the configuration of a communication device 100*c* is different from that in the third embodiment. The functions of the other devices are the same as those illustrated in FIG. 10, these devices are denoted with the same reference numerals and the explanations are omitted.

As illustrated in FIG. 13, the communication device 100*c* includes an address storage unit 121*c*, the list storage unit 122, the transmitting/receiving unit 101, a changing unit 102*c*, the completion determining unit 103, and an analyzing unit 104. The fourth embodiment is different from the third embodiment in the function of the changing unit 102*c*, in the data structure of the address storage unit 121*c*, and with the addition of the analyzing unit 104. Because the configurations and functions of the other units are the same as those illustrated in FIG. 10, a block diagram that illustrates the configuration of the communication device 100*b* according to the third embodiment, these units are denoted with the same reference numerals and their explanations are omitted here.

FIG. 14 is a table that illustrates an example of the data structure of data (the address change rule) stored in the address storage unit 121*c* according to the fourth embodiment. FIG. 14 illustrates an example of the address change rule that relates a character string contained in a communication request packet to a communication target IP address.

A configuration may be such that an address to which the destination address is to be changed is selected considering the destination address of a communication request packet. FIG. 15 is a table that illustrates another example of the data structure of data (the address change rule) stored in the address storage unit 121*c* according to the fourth embodiment. FIG. 15 illustrates an example of the address change rule that relates a virtual communication target IP address, a character string, and a communication target IP address to one another.

The analyzing unit 104 analyzes a communication request packet so as to determine whether the communication request packet includes a stored character string illustrated in FIG. 14 or 15. For example, in the case of a communication using an HTTP, the analyzing unit 104 determines whether an HTTP header or body includes a stored character string illustrated in FIG. 14 or 15.

The changing unit 102*c* is different from the changing unit 102*b* according to the third embodiment in that the changing unit 102*c* refers to an analysis result of the analyzing unit 104, to the address change rule, and to the relation list so as to determine an IP address (a communication target IP address) to which the destination IP address is to be changed.

The process described below is additionally performed in the fourth embodiment. Specifically, when a communication request packet is received (for example, at Step S101 illustrated in FIG. 6), the analyzing unit 104 determines whether the communication request packet includes a character string that is defined in the address change rule. If a character string corresponding to the character string illustrated in FIG. 14 or 15 is included, the analyzing unit 104 sends, to the changing unit 102*c*, the corresponding communication target IP address in accordance with the address change rule illustrated in FIG. 14 or 15.

The changing unit 102*c* refers to the sent communication target IP address so as to determine an IP address for a change and changes the destination IP address. The changing unit 102*c* then registers, in the relation list, the communication target IP address that is obtained after a change and the destination IP address that is obtained before a change in relation to each other.

As described above, according to the fourth embodiment, the communication target device(s) 300, i.e., the communication destination, can be changed in accordance with a character string included in a communication request packet. Therefore, it is possible to perform a function of changing to the address of the communication target device(s) 300 that has a copy function if the character string, for example, "Copy Counter" is included and of changing to the address of the communication target device(s) 300 that has a scanner function if the character string "Scan Counter" is included.

Fifth Embodiment

In the above-described embodiments, if an operation performed by the evaluation target device 200 changes the status of the communication target device(s) 300, the status of the communication target device(s) 300 is changed by the first communication; therefore, there is a possibility that an expected evaluation cannot be performed in the second and subsequent communications. According to a fifth embodiment, the communication device 100 determines the contents of communication to be relayed and, if the communication with the communication target device(s) 300 that is assigned to an address in accordance with the contents of the communication is completed, the status of the communication target device(s) 300 is changed or set to a desired status so as to stand by for a subsequent access.

Figures 16, 17:
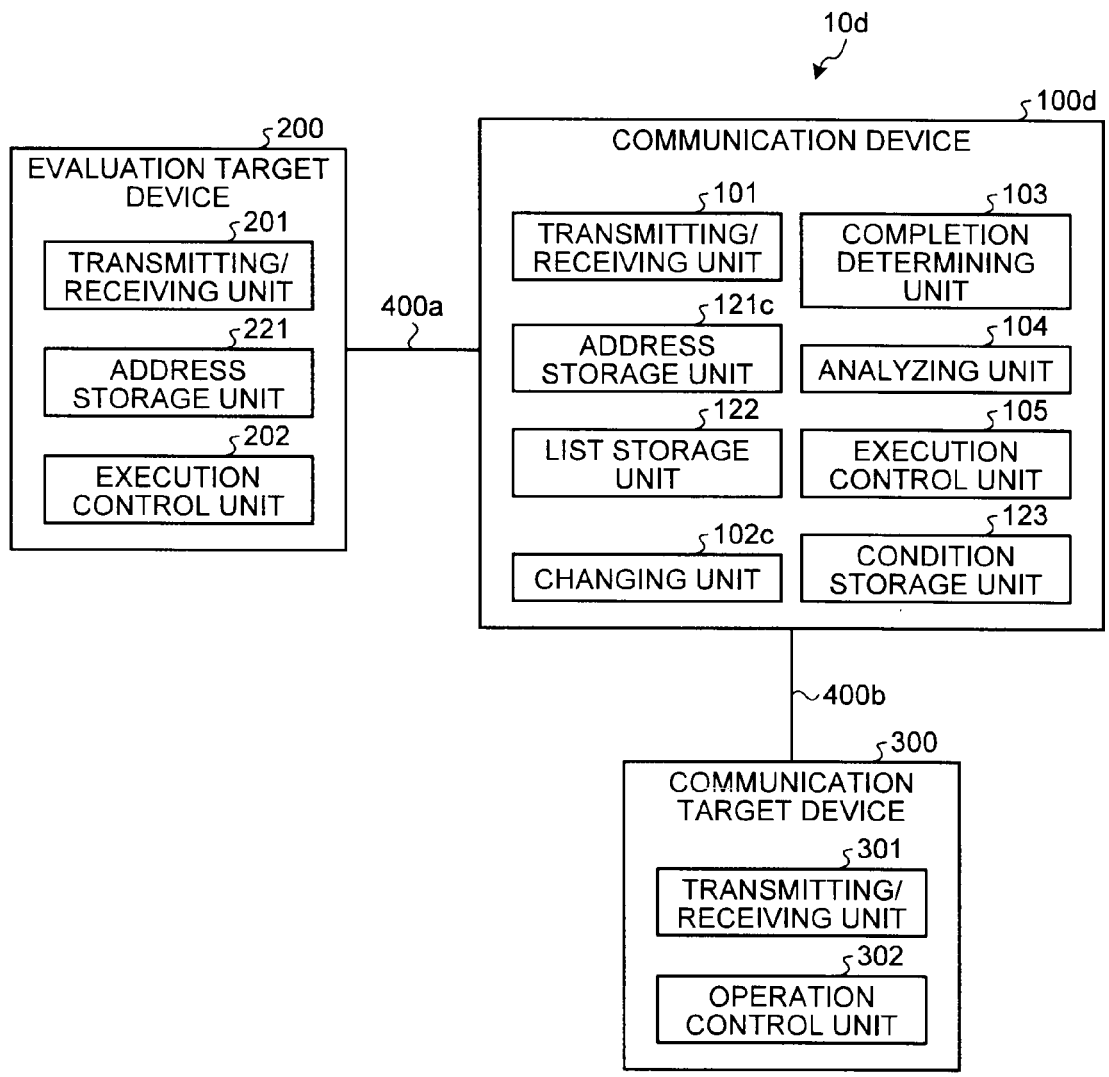
FIG. 16 is a block diagram that illustrates an example of the detailed configuration of each device included in a communication system according to a fifth embodiment.
FIG. 17 is a table that illustrates an example of the data structure of conditions stored in a condition storage unit.

FIG. 16 is a block diagram that illustrates an example of the detailed configuration of each device included in a communication system 10*d* according to the fifth embodiment. In the fifth embodiment, the configuration of a communication device 100*d* is different from that in the fourth embodiment. Because the functions of the other devices are the same as those illustrated in FIG. 13, these devices are denoted with the same reference numerals and their explanations are omitted.

As illustrated in FIG. 16, the communication device 100*d* includes the address storage unit 121*c*, the list storage unit 122, the transmitting/receiving unit 101, the changing unit 102*c*, the completion determining unit 103, the analyzing unit 104, an execution control unit 105, and a condition storage unit 123. The fifth embodiment is different from the fourth embodiment with the addition of the execution control unit 105 and the condition storage unit 123. Because the configurations and functions of the other units are the same as those illustrated in FIG. 13, a block diagram that illustrates the configuration of the communication device 100*c* according to the fourth embodiment, these units are denoted with the same reference numerals and their explanations are omitted here.

The condition storage unit 123 stores a condition that defines a process to be performed in accordance with the contents of a communication. FIG. 17 is a table that illustrates an example of the data structure of conditions stored in the condition storage unit 123. FIG. 17 illustrates an example of a condition that links a character string included in a communication request packet to a path for a program that is started after the completion of a communication (a post communication-completion start-program path). The condition on the first line illustrated in FIG. 17 indicates an example where, if a character string "Entry Address" is included in a packet, the program "delete-address.exe" for deleting the set address is executed after the communication is completed. This example is based on an assumption that, when a communication request packet including the character string "Entry Address" is received, a process of setting an address is executed on the communication target device(s) 300.

The condition on the second line illustrated in FIG. 17 indicates an example where, if a packet includes the character string "Counter", the program "reset-counter.exe" for resetting a counter is executed after the communication is completed.

A program executed after the completion of a communication may be stored in the condition storage unit 123 or a different storage unit.

When the completion determining unit 103 determines that a communication has been completed with respect to a communication request packet, the execution control unit 105 executes a program designated by a post communication-completion start-program path included in a condition of the condition storage unit 123.

The process described below is additionally performed by the fifth embodiment. Specifically, when a communication request packet is received (for example, at Step S101 illustrated in FIG. 6), the analyzing unit 104 determines whether the communication request packet includes a character string defined by a condition of the condition storage unit 123. If the communication request packet includes a character string corresponding to the character string in the condition, the execution control unit 105 executes a program designated by the path that is related to the character string after the communication is completed.

An explanation is given below of a specific example of the fifth embodiment. Suppose, for example, that a communication request packet for requesting registration of 10 addresses (the same addresses) to 100 devices is transmitted from the evaluation target device 200. At that time, if there are only ten actual devices (the communication target device(s) 300), registration can be performed on the first to tenth devices. Because the same addresses have been already registered, even if an address registration request is issued to the eleventh and subsequent devices, a reply indicating that the address has been registered is returned. Therefore, there is a possibility that an appropriate test cannot be performed.

To prevent such a situation, the registered address needs to be deleted after a result is returned with respect to a single communication request packet and before the subsequent communication is performed. In the fifth embodiment, in accordance with a condition such as the one illustrated in FIG. 17 and in accordance with the contents of a communication request packet, the program designated by the condition is executed after the result reply from the communication target device(s) 300 is completed (the communication is completed). Because the completion of the result reply is treated as a trigger, the designated program may be executed on the communication target device (s) 300 that has transmitted the result reply.

Modified Example 1

Sometimes, it is necessary, as a condition for evaluation, that a set value of each of the communication target device(s) 300 that are accessed by the evaluation target device 200 is a different value depending on each of the communication target device(s) 300. In this case, different set values have to be pre-set in the communication target device(s) 300. Suppose, for example, that the content of a request from the evaluation target device 200 is to check the registered contents of an address book or to acquire the value of a counter. In such a case, it is assumed that there is a situation in which it is desirable that addresses have been already registered or the value of a counter has been set to a desired value. In that case, before a communication request is transmitted from the evaluation target device 200 to the communication target device(s) 300, set values of the communication target device(s) 300 has to be changed in advance.

In the modified example 1, a configuration is such that a condition of the condition storage unit 123 further includes a path for a program that is started before a request for communication (a pre communication-request start-program path). In this case, before transmitting a communication request packet to the communication target device(s) 300, the execution control unit 105 executes the program designated by the pre communication-request start-program path that is related to the character string.

Modified Example 2

Sometimes, it is necessary, as a condition for evaluation, that a set value of the communication target device(s) 300 with a certain address is a specific value. More specifically, there is a need to deal with a request such that "when the evaluation target device 200 accesses this address, the set information of the evaluation target device 200 has to be this value".

In the modified example 2, the order of access performed by the evaluation target device 200, or the like, is pre-registered in the communication device 100. For example, a configuration is such that, when the communication with the communication target device(s) 300 is completed, a storage unit, or the like stores the IP address of the communication target device(s) 300 that is accessed by the evaluation target device 200 next to the communication target device(s) 300 and stores a set value that needs to be set in the communication target device(s) 300 with the address.

Suppose, for example, that the evaluation target device 200 executes the acquisition of a counter for the $1^{st}$ to $100^{th}$ devices and then executes the registration of addresses for the $101^{st}$ to $200^{th}$ devices. In this case, the communication device 100 pre-registers information in accordance with the access order. The changing unit 102c refers to this information so as to determine, in advance, which one of the communication target device(s) 300 is to be assigned in response to which communication request. The easiest way to determine the assignment is to assign the communication target device(s) 300 in rotation according to the order.

With this configuration, the communication device 100 can make a setting for the communication target device(s) 300 before a communication request packet is transmitted to the communication device 100. Thus, a communication request packet can be transmitted from the evaluation target device 200 to the communication target device(s) 300 in a smooth manner. For example, in the method for starting a program to set the communication target device(s) 300 after a communication request packet is received according to the modified example 1, it takes a long time to make a setting; therefore, there is a possibility that an appropriate test cannot be conducted. Such a problem can be resolved according to the modified example 2.

Figure 18:
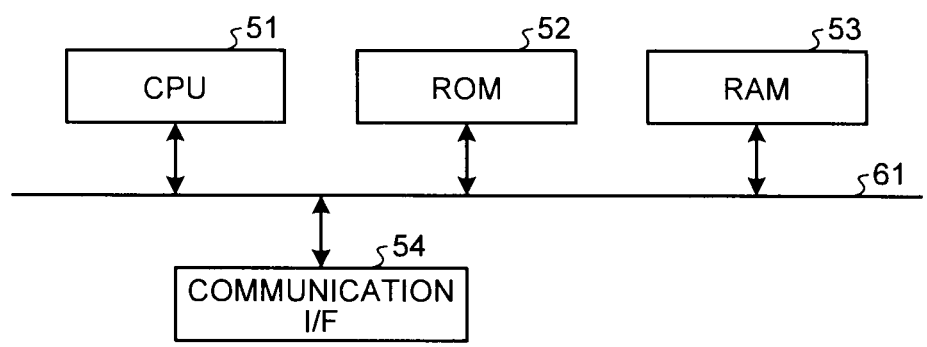
FIG. 18 is an explanatory diagram that illustrates an example of the hardware configuration of the communication devices according to the first to fifth embodiments.

An explanation is given, with reference to FIG. 18, of the hardware configuration of the communication devices according to the first to fifth embodiments. FIG. 18 is an explanatory diagram that illustrates an example of the hardware configuration of the communication devices according to the first to fifth embodiments.

The communication device according to the first to fifth embodiments includes a control device such as a central processing unit (CPU) 51, a storage device such as a read only memory (ROM) 52 or a random access memory (RAM) 53, a communication I/F 54 that is connected to a network to perform communication, and a bus 61 that connects each unit.

A program to be executed by the communication devices according to the first to fifth embodiments is provided such that it is installed in the ROM 52, or the like, in advance.

A configuration may be such that a program to be executed by the communication devices according to the first to fifth embodiments is provided, as a computer program product, by being stored, in the form of a file that is installable and executable, in a recording medium readable by a computer, such as a compact disk read only memory (CD-ROM), a flexible disk (FD), a compact disk recordable (CD-R), or a digital versatile disk (DVD).

Further, a configuration may be such that a program to be executed by the communication devices according to the first to fifth embodiments is stored in a computer connected via a network such as the Internet and provided by being downloaded via the network. Moreover, a configuration may be such that a program to be executed by the communication devices according to the first to fifth embodiments is provided or distributed via a network such as the Internet.

A program to be executed by the communication devices according to the first to fifth embodiments can cause a computer to function as each unit of the above-described communication device. In the computer, the CPU 51 reads a program from a recording medium readable by a computer, loads the read program on a main storage device, and executes the program.

According to the present embodiments, an advantage is produced such that it is possible to evaluate software, for which a large number of devices is usually needed, by using a small number of devices.

Also, according to an aspect of the present embodiments, a communication system includes: a communication device that executes target software to be evaluated; and a communication target device that is a communication target of the software, wherein the communication device includes an execution control unit that executes the software to generate an outgoing message and receive a reply message in response to the outgoing message; an address storage unit that stores an address of the communication target device; a destination changing unit that changes a destination address included in the outgoing message generated using the software to any one of addresses stored in the address storage unit; a transmitting unit that transmits the outgoing message for which the destination address has been changed to the communication target device with the changed destination address; a receiving unit that receives, from the communication target device, a reply message in response to the outgoing message; a source changing unit that changes a source address included in the reply message to the destination address that is obtained before being changed by the destination changing unit; and an output unit that outputs, to the software, the reply message for which the source address has been changed, and the communication target device includes a transmitting/receiving unit that receives, from the communication device, the outgoing message for which the destination address has been changed and that transmits, to the communication device, a reply message in response to the received outgoing message.

In another aspect of the present embodiments, the address storage unit stores addresses that are designated as destinations of a message using the software, each of the addresses being related to any one of the addresses of the communication target devices, and the destination changing unit acquires, from the address storage unit, the address of the communication target device corresponding to the destination address included in the outgoing message and changes the destination address included in the outgoing message to the acquired address.

In still another aspect of the present embodiments, the communication device further includes a list storage unit that stores a relation list that relates a pre-change destination address to a post-change destination address, and the source changing unit acquires, from the relation list, a pre-change destination address corresponding to a post-change destination address that matches the source address included in the reply message, changes the source address included in the reply message to the acquired pre-change destination address, and deletes the relation list from the list storage unit after a change is made.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication device that is connected to a plurality of communication target devices, the communication device comprising:
    an address memory that stores addresses of the communication target devices;
    a destination changing processor that changes a destination address included in an outgoing message to any one of the addresses stored in the address memory, the outgoing message being generated using target software to be evaluated;
    a transmitter that transmits the outgoing message for which the destination address has been changed to the communication target device with the changed destination address;
    a receiver that receives, from the communication target device, a reply message in response to the outgoing message;
    a source changing processor that changes a source address included in the reply message to the destination address that is obtained before being changed by the destination changing processor;
    an output processor that outputs, to the software, the reply message for which the source address has been changed;
    a list memory that stores a relation list that relates a pre-change destination address to a post-change destination address; and
    an analyzing processor makes an analysis to determine whether the outgoing message includes a character string which includes alphabetical characters, the character string including at least a function of a device, wherein the destination changing processor changes the destination address included in the outgoing message to an address that is included in the addresses stored in the address memory and is determined using the character string which includes alphabetical characters, and wherein the source changing processor acquires, from the relation list, a pre-change destination address corresponding to a post-change destination address that matches the source address included in the reply message, changes the source address included in the reply message to the acquired pre-change destination address, and deletes the relation list from the list memory after a change is made.

2. The communication device according to claim 1, wherein the address memory stores addresses that are designated as destinations of a message by the software, each of the addresses being related to any one of the addresses of the communication target devices, and the destination changing processor acquires, from the address memory, the address of the communication target device corresponding to the destination address included in the outgoing message and changes the destination address included in the outgoing message to the acquired address.

3. The communication device according to claim 1, wherein:

analyzing processor that makes an analysis to determine whether the outgoing message includes a predefined character string, the communication device further comprising an execution control processor that, if the outgoing message includes the predefined character string, executes a process that is determined in accordance with the predefined character string after the reply message is transmitted.

4. The communication device according to claim 3, wherein the execution control processor further executes, if the outgoing message includes the predefined character string, a process that is determined in accordance with the character string before the outgoing message for which the destination address has been changed is transmitted.

5. The communication device according to claim 4, wherein the execution control processor executes, if the outgoing message includes the predefined character string, a process that is determined in accordance with the character string on the communication target device that is determined according to the character string before the outgoing message for which the destination address has been changed is transmitted.

6. The communication device according to claim 1, wherein the transmitter further transmits an error message to the software if the destination changing processor cannot change the destination address included in the outgoing message to any one of the addresses stored in the address memory.

7. A communication system comprising:

an evaluation target that executes target software to be evaluated;

a communication target device that is a communication target of the software; and a communication device that is connected to the evaluation target and the communication target, wherein:

the evaluation target executes the software so as to transmit an outgoing message to the communication device and receives, from the communication device, a reply message in response to the outgoing message, the communication device includes an address memory that stores an address of the communication target;

a destination changing processor that changes a destination address included in the outgoing message transmitted using the software to any one of addresses stored in the address memory;

a transmitter that transmits the outgoing message for which the destination address has been changed to the communication target with the changed destination address;

a receiver that receives, from the communication target, a reply message in response to the outgoing message;

a source changing processor that changes a source address included in the reply message to the destination address that is obtained before being changed by the destination changing processor;

an output processor that outputs, to the software, the reply message for which the source address has been changed; and a list memory that stores a relation list that relates a pre-change destination address to a post-change destination address, an analyzing processor makes an analysis to determine whether the outgoing message includes a character string which includes alphabetical characters, the character string including at least function of device, and the communication target device includes a transmitter/receiver that receives, from the communication device, the outgoing message for which the destination address has been changed and that transmits, to the communication device, a reply message in response to the received outgoing message, wherein the destination changing processor changes the destination address included in the outgoing message to an address that is included in the addresses stored in the address memory and is determined using the character string which includes alphabetical characters, and wherein the source changing processor acquires, from the relation list, a pre-change destination address corresponding to a post-change destination address that matches the source address included in the reply message, changes the source address included in the reply message to the acquired pre-change destination address, and deletes the relation list from the list memory after a change is made.

8. The communication system according to claim 7, wherein:

the communication target device includes a plurality of communication target devices, the address memory stores addresses that are designated as destinations of a message using the software, each of the addresses being related to any one of the addresses of the communication target devices, and the destination changing processor acquires, from the address memory, the address of the communication target device corresponding to the destination address included in the outgoing message and changes the destination address included in the outgoing message to the acquired address.

9. The communication system according to claim 7, wherein the communication device further includes a list memory that stores a relation list that relates a pre-change destination address to a post-change destination address, and the source changing processor acquires, from the relation list, a pre-change destination address corresponding to a post-change destination address that matches the source address included in the reply message, changes the source address included in the reply message to the acquired pre-change destination address, and deletes the relation list from the list memory after a change is made.

10. A computer program product comprising a non-transitory computer-readable medium having computer-readable program codes, performed by a communication device, the program codes when executed causing the communication device to execute:

storing, by an address memory, an address of a communication target device;

changing a destination address included in an outgoing message to any one of the addresses stored in the address memory, the outgoing message being generated using target software to be evaluated;

transmitting the outgoing message for which the destination address has been changed to the communication target device with the changed destination address;

receiving from the communication target, a reply message in response to the outgoing message;

changing a source address included in the reply message to the destination address that is obtained before being changed at the changing; and outputting to the software, the reply message for which the source address has been changed, wherein the method further comprises determining whether the outgoing message includes a character string which includes alphabetical characters, the character string including at least function of device, wherein the changing of the destination address changes the destination address included in the outgoing message to an address that is included in the addresses stored in the address memory and is determine using the character string which includes alphabetical characters, wherein the changing of the source address includes acquiring, from a relation list that relates a pre-change destination address to a post-change destination address, a pre-change destination address corresponding to a post-change destination address that matches the source address included in the reply message, changes the source address included in the reply message to the acquired pre-change destination address, and deletes the relation list from the list memory after a change is made.

\* \* \* \* \*